Feb. 23, 1954

H. L. BENNETT 2,669,870

PRODUCTION DYNAMOMETER

Filed Sept. 24, 1949

INVENTOR.
HAROLD L. BENNETT
BY
Reynolds & Beach
ATTORNEYS

Feb. 23, 1954  H. L. BENNETT  2,669,870
PRODUCTION DYNAMOMETER
Filed Sept. 24, 1949  5 Sheets-Sheet 2

INVENTOR.
HAROLD L. BENNETT
BY
Reynolds & Beach
ATTORNEYS

Feb. 23, 1954  H. L. BENNETT  2,669,870
PRODUCTION DYNAMOMETER
Filed Sept. 24, 1949  5 Sheets-Sheet 3

INVENTOR.
HAROLD L. BENNETT
BY
Reynolds & Beach
ATTORNEYS

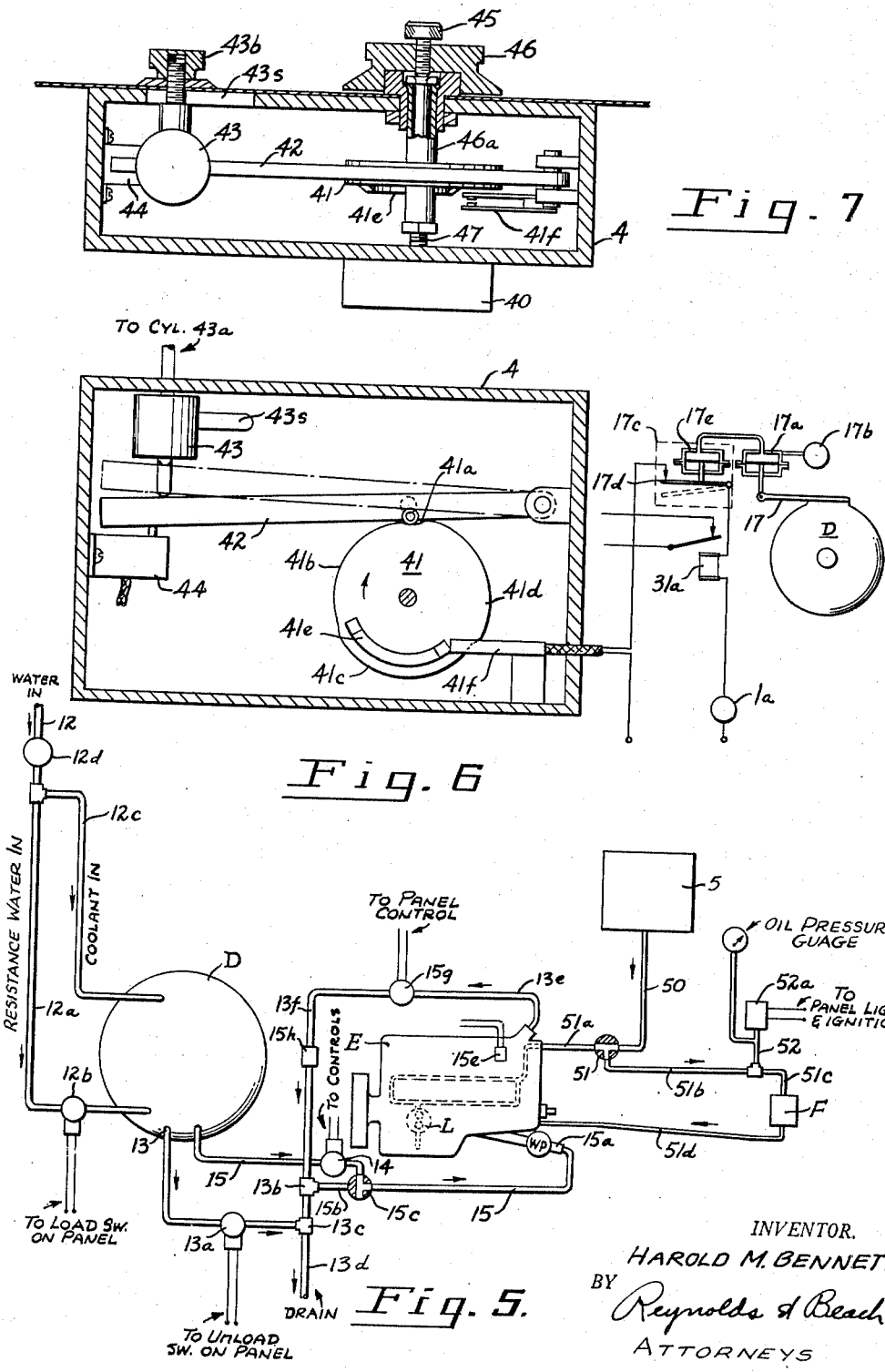

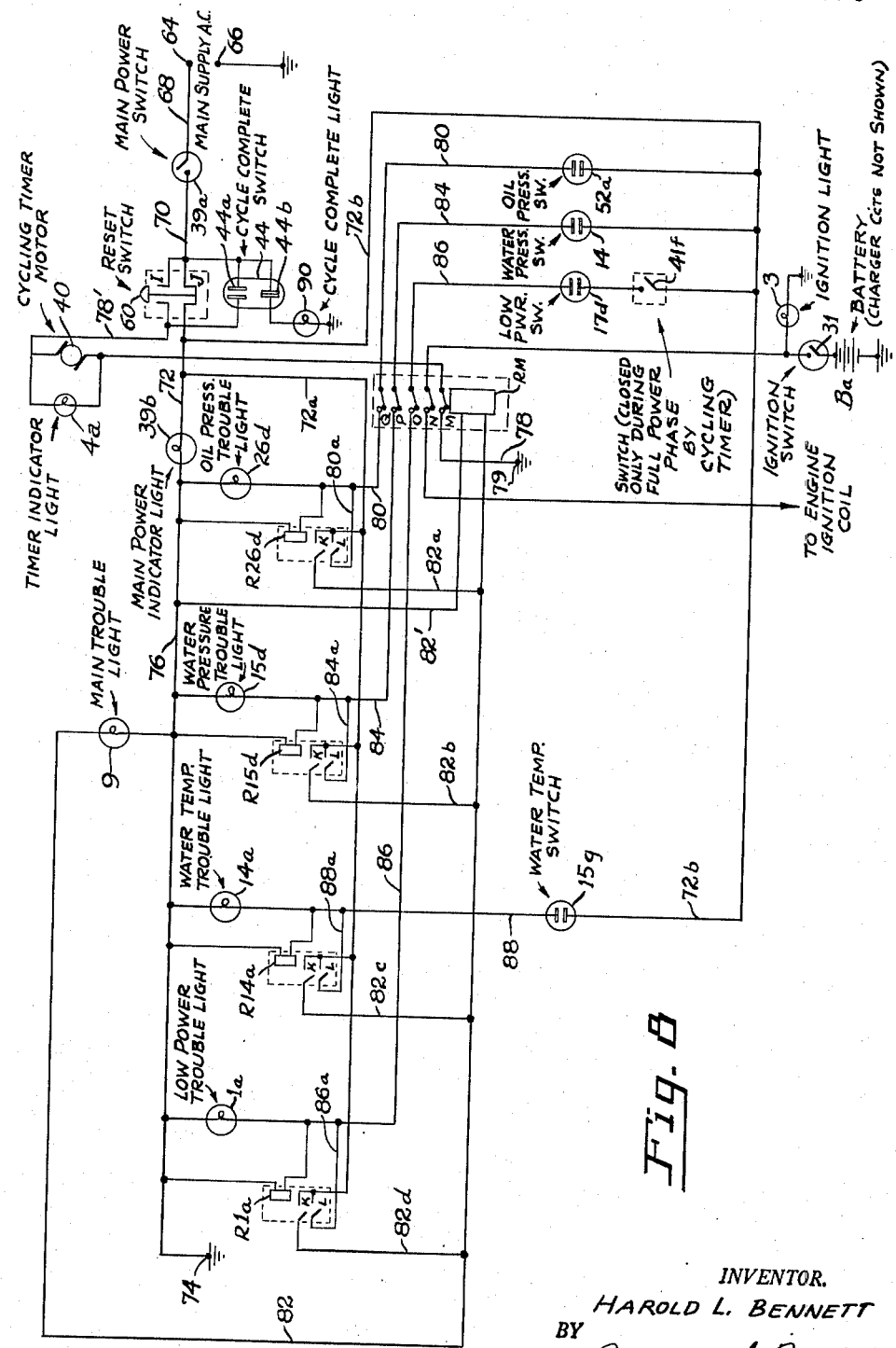

Patented Feb. 23, 1954

2,669,870

UNITED STATES PATENT OFFICE 2,669,870

PRODUCTION DYNAMOMETER

Harold L. Bennett, South Bend, Ind., assignor, by mesne assignments, to Clayton Manufacturing Company, El Monte, Calif., a corporation Application September 24, 1949, Serial No. 117,697

17 Claims. (Cl. 73—116)

Manufacturers of automobiles desire to test each engine immediately prior to installation for a reasonably extended period of time, for instance thirty minutes, an hour, or even several hours, under varying conditions of load and speed, in order to run in the engine to some degree, and to ascertain that the engine is in good operating condition, free from imperfections, and equal to the job it will be called upon to do, steadily and continuously, after installation. Manifestly, it is better to do this before installation, and before any road test, so that in the event an imperfection is discovered, it will be a simple matter to set aside the imperfect engine and to correct the observed imperfection, before installation, and it will not be necessary to remove it from the automobile in which it has been installed.

Such tests are commonly made by connecting the engine to a dynamometer, but heretofore it has been the practice to test the engine briefly—that is, in a matter of a few minutes only—at different speeds or under different load conditions, simply because the time of a highly-paid mechanic was not available, economically speaking, to observe the operation of such an engine throughout a sufficiently extended period such as the period of an hour, already mentioned. Nevertheless, it is quite possible that a defect such as imperfect cooling or low torque delivery will not manifest itself immediately, and consequently a defective engine will apparently be free from defects when briefly tested with a dynamometer, but upon more extended operation will prove defective, and consequently becomes the cause of quite appreciable expense, to correct the defect.

According to the present invention there is provided a dynamometer and an engine stand for use in conjunction therewith, by means of which each individual engine can be quickly set in a fixed position and coupled to the dynamometer, to gasoline, oil, water, electrical and exhaust connections, can be put into operation under load conditions, and thenceforward can continue through a test cycle in which, automatically, it is run at various speeds and under different loadings, through a test run of as much as an hour perhaps, all with a minimum of attention by the attendant who, in the meantime, can go about installing or removing or correcting the defects in other engines. By such an arrangement and by the provision of a battery of test dynamometers, an automobile manufacturer can adequately test each engine before its installation with a minimum of effort and labor expense, to the end of ascertaining and correcting deficient or defective engines and of passing for installation correctly operative engines with the assurance that they will not need to be worked on nor removed after once being installed in the automobile.

There are various defects that may arise in such testing of engines. Naturally, it is desirable to observe quickly and readily the torque developed and the corresponding engine speed, and in addition it is necessary to ascertain whenever there arise conditions of low power developed by the engine when it should be developing full power, excessive water temperature in the engine's cooling system, incorrect water pressure in the same system, low oil pressure developed by the engine's oil pump, incorrect timing, otherwise faulty ignition, operation or non-operation of the battery charger, and the like. Since the attendant will have a number of such dynamometers in his charge, and cannot at one time observe all of them, it is desirable for protection of the engine to discontinue a test automatically upon the occurrence or observance by the dynamometer of a defective condition. Moreover, it is necessary in addition that the fact of trouble in a particular engine being tested be called promptly to the attention of the attendant, that he be apprised of the particular operating conditions under which the test was being conducted at the time the defect was detected, and the particular nature of the defect. The present invention incorporates automatic mechanism for attaining these ends. It includes an indicator and control panel whereon is indicated prominently the engine torque and the engine R. P. M., dynamometer R. P. M., and such factors as engine oil pressure and engine temperature, and it includes an indicator to show that a test is proceeding normally. In addition, the panel includes a prominently-displayed main trouble light which automatically is illuminated upon the occurrence of any trouble or a defect, and individual trouble lights which are so connected as to indicate the precise nature of the trouble, and in addition the panel or the control stand of which it is a part includes automatic controls which stop the engine or otherwise protect it from injury which might arise from continuance of the test. Moreover, it includes a further light, to wit, a cycle-complete light, which is illuminated and which is prominently observable to indicate such time as the test cycle has been completed satisfactorily, and automatic controls which at the same time slow down the engine to idling speed or stop it; the cycle-complete light assures the attendant that the slow down or stoppage is a result, not of a defect, but of satisfactory completion of the test.

Further important features of the invention pertain to the control circuit by which the various functions of the test system are controlled and coordinated. Holding relays in the circuit are actuated selectively by appropriate trouble switches (e. g., low oil pressure, low water pressure, high water temperature, low power), and when any one of these is actuated the engine ignition circuit is opened and held open and a corresponding trouble light, as well as the main trouble light, is maintained energized so that an attendant can ascertain the nature of the difficulty even though not on the scene when the trouble occurred. A master relay simultaneously opens other trouble indicator circuits so that as the engine is stopped by the occurrence of one particular trouble, such as high water temperature, for instance, another trouble light, such as for low oil pressure, will not be energized falsely as a result. This same master relay stops the timer motor also, whereby the phase of the cycle at the occurrence of trouble may be determined.

A reset switch is used to insure that all relays are open, all trouble lights are out, and to start the test, or restart it after occurrence of a trouble; and, as a result of a further circuit feature, this switch must be held depressed long enough for engine oil pressure to be built up by the engine's oil pump before the ingition circuit can be closed and the engine started.

While an automobile manufacturer will assemble thousands of cars, all alike, he will from year to year change models and may thereby require some alteration in the set-up of the test stand for receiving the engine. Moreover, any such manufacturer will at one time concentrate on one model and at a different time on a different, but concurrent model. For example, one prominent make is currently being manufactured with six-in-line, eight-in-line, and V-8 styles of engine. The present device must be adjustable, therefore, in a manner to accommodate each such engine, in order to avoid duplication of expense.

The present invention may also be used, with certain simple modifications, as a run-in dynamometer, so that before installation of an engine in the automobile it may be run throughout a period of a number of hours and under different load conditions, and at different speeds, in order to break it in and avoid or lessen the necessity of low-speed driving for an appreciable period after it is installed and the car is delivered.

It is believed that enough has been said to indicate the general nature of this invention and the general objects thereof. Subsidiary objects will be more readily ascertainable as the specification progresses, and from study of the drawings and of the claims.

In the accompanying drawings the invention is shown embodied in a typical form, such as is presently in regular use in the testing of automobile engines.

Figure 5 is a schematic diagram showing the water system for the dynamometer and engine, the engine supplemental lubrication system and certain control and indicator connections.

Figure 6 is a vertical sectional view of the cycling timer accompanied by a diagrammatic showing of that part of the ignition cut-out system which turns off the engine if it fails to develop necessary torque during the high-power phase of the cycle; Figure 7 is a horizontal section of the cycling timer.

Figure 8 is a schematic diagram of the trouble indicator, and ignition circuits.

Figure 1:
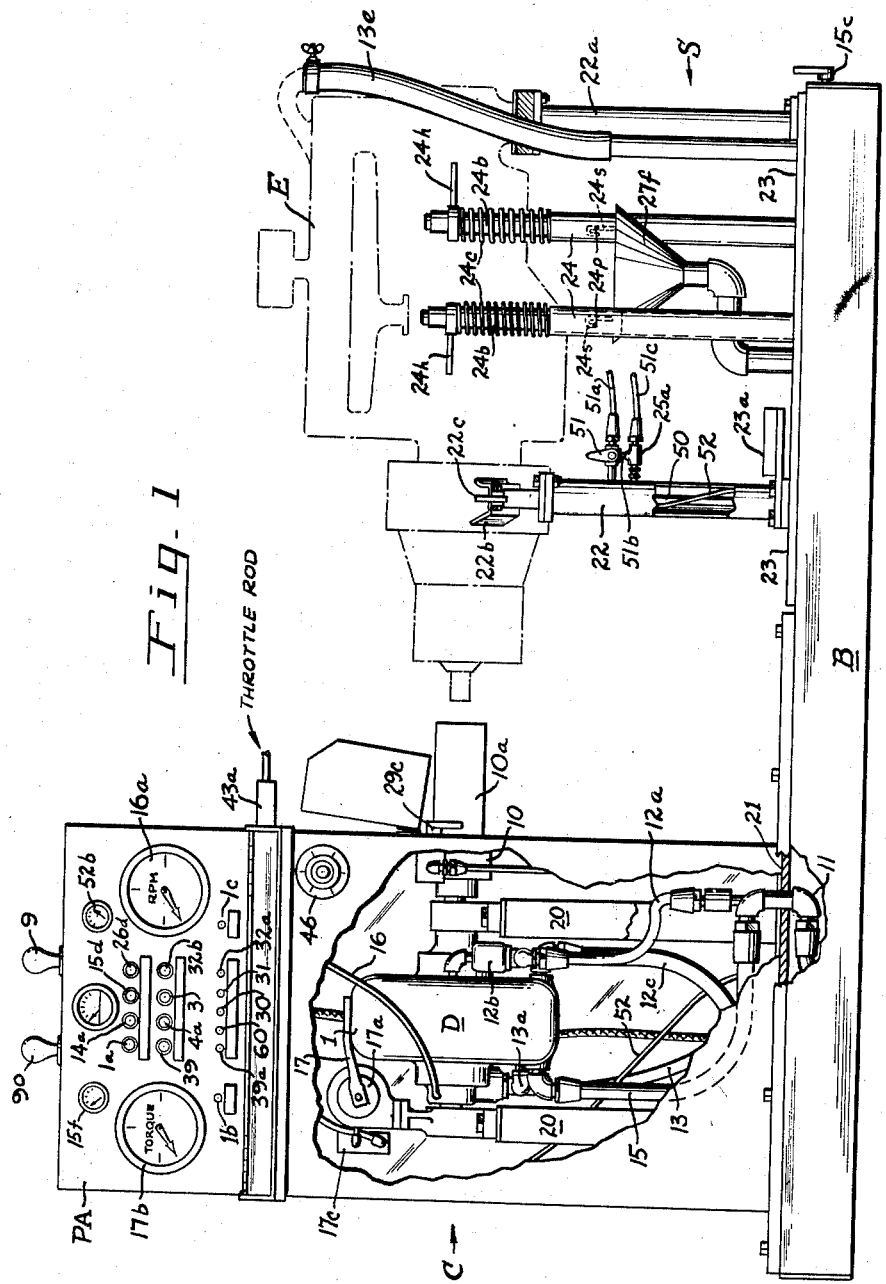
Figure 1 is a side elevation view of the test dynamometer apparatus with parts broken away for convenience in illustration, an engine, shown by dotted lines, being mounted on the test stand for test.

A brief general description of the device will help in understanding the details thereof. It consists, in general terms, of a dynamometer D, fixedly located within a housing, part of control stand C, which is mounted upon a base B for movement in an axial direction to engage and disengage the shaft of the dynamometer with the shaft of the engine E which is to be tested, as it rests upon the engine stand S. The engine is supported in brackets, which are part of the engine stand S, and which are located similarly to the engine support brackets in the automobile chassis, to register with the bearing pads and brackets carried by the engine itself, and the securement of the engine is thus in a definite, fixed position but of a temporary, quick-detachable nature. The engine stand S is provided with quickly-engageable supply, discharge, indicating, and control connections to the various engine parts and functions. For example, a battery is mounted upon the engine stand and is connected to the electrical circuits of the engine E through a switch and controls upon the control stand C. A battery charger on the control stand can be connected to the battery to renew the charge used in starting the engine. Exhaust connections are coupled, by quick-detachable means, to the single or dual exhaust manifolds, according to the type of the engine. Gasoline supply connections are made to the carburetor, and the throttle is controllable through automatic controls on the control stand. In the event the engine E is initially assembled without its carburetor, a stand-by carburetor may be mounted on the engine stand S and feeds to the engine's intake manifold. Water connections are arranged for quick engagement and disengagement with the water circulating system of the engine, and the inlet to the latter in turn is connected to the cooling jacket of the dynamometer D within the control stand C, so that the engine coolant is preheated somewhat, and thermostats and controls sensitive to water temperature and pressure are connected to the control stand C. Special connections for lubricating oil are made to the engine, and, in this connection, it is to be noted that according to one plan of operation the engine to be tested is devoid of lubricant oil when mounted in the engine stand S, and a first operation is to insure the forcing of lubricating oil through the various passageways and into the sump, and finally through the oil pump of the engine itself, and at the conclusion of a test the oil is drained from the tested engine. Again, as in the case of the water, various controls sensitive to the oil pressure are connected to indicators on the panel PA of the control stand C.

Various flexible connections are employed, because of the necessity for connection to these various indicators and controls on the movably mounted control stand. The dynamometer D may be of any suitable type, but preferably is of the type shown, for example in my Patent No. 2,428,005, dated September 30, 1947. Such dynamometers require the introduction and discharge, usually by independent controls, of coolant water and of resistance liquid, usually water, and the transmission of impulses, usually by pressure lines, to indicators and automatic controls, hence there are provided various other flexible connections from the stand-mounted dynamometer D to supply sources and to drains and to points of delivery.

It is desirable to conduct each test through a cycle during which, without interruption, the engine is driven in succession at several different speeds, which requires variation of the throttle setting of the engine in accordance with automatic cycling timer controls upon or associated with the control stand C, and these different settings are automatically accomplished, following predetermined periods of tests at one speed and at a corresponding throttle setting, and under a constant, predetermined load, by an automatic cycling timer device which controls the complete cycle of operation. Variation of the dynamometer load, is accomplished at the outset of a cycle, in order to match the load to the engine speed at the automatically controlled initial throttle setting, by manually varying the amount of resistance liquid contained within the dynamometer casing, by valve means associated with the control stand; it could likewise be accomplished under automatic control at each cycle stage, but no necessity for so doing is likely to arise. Because variation of the load conditions will cause variation in the heating of the dynamometer, and because it is desirable to maintain therein constant temperature conditions, there may be entailed, in accordance with features of the dynamometer which have already been set forth in my prior patents or in pending applications, such as Serial No. 649,967, filed February 25, 1946, automatic variation of the coolant supply by means inherent in the dynamometer itself.

In addition to indicating upon the control panel PA the engine torque and the engine speed in revolutions per minute, and the usual engine temperature and engine oil pressure indications, provision is made upon the control stand or its panel for indicating any undesirable condition which occurs during or causes interruption of the test, such as insufficient power at the final, high speed stage at least, excessive water temperature or water pressure, or improper oil pressure, or a failure of the main power for conducting the test, or defect in the cycling timer, or failure of the ignition circuit, or for indicating the operation of the battery charger. Any malfunctioning with respect to any of these conditions or accessories (other than the battery charger) will produce immediate corrective or stopping action, and in addition, by illumination or extinguishment of a distinctively colored light individual to that particular function, will call attention to the part which was malfunctioning, and a trouble light which is common to all malfunctioning devices will light up, to indicate the fact of a defect. Besides these indications of malfunctioning, there is also on the control panel a light to indicate when the cycle is completed without malfunctioning, and one to indicate that it is progressing normally.

Also mounted on the control stand are switches and controls, such as an ignition switch to deliver battery current to the ignition system of the engine being tested, a starter button, a main power switch, a switch for resetting of the cycle after interruption, a switch to effect or initiate recharging of the battery if the engine generator is not assembled with the engine, and manual switches for loading and unloading the dynamometer unit, by addition of resistance water thereinto or its discharge therefrom.

The dynamometer unit D, as has been stated, may be of any suitable internal construction, but preferably is of the general type shown in my Patent No. 2,428,005. It consists essentially of a stator casing 1, supported for oscillation in brackets 20, mounted in turn upon a plate 21 guided in and slidable along the base B. The rotor of the dynamometer terminates in a rotative shaft bearing the coupling 19 arranged for coupling through the medium of a universal joint at 10a, to the splined end of the engine shaft. The dynamometer casing 1 is water jacketed, or constructed in an equivalent manner, to maintain separate the respective resistance water and coolant compartments and connections. Water from a supply main is admitted at 12, which branches and delivers resistance water by the branch 12a past a solenoid controlled valve 12b, and resistance liquid may be unloaded from the interior of the casing 1 by way of the outlet 13 past a solenoid controlled valve 13a. Air pressure lines and vent lines operatively associated with the resistance water inlet to the casing, such as are shown in Patent No. 2,428,005, may be employed to enable prompt loading and unloading of the liquid, but have not been shown herein. Coolant water is supplied to the jacket of the casing 1 by way of the branch 12c and coolant leaves the water jacket by way of the coolant outlet 15. A tachometer connection 16 leads to a gauge 16a upon the control stand to indicate the speed of rotation of the dynamometer rotor, and the torque arm 17 operates through a pressure diaphragm 17a connected to a torque indicator 17b on the control stand to indicate and translate into terms of torque the power absorbed from the engine by the dynamometer.

Upon the opposite end of the base B provision is made for mounting and supplying the necessary connections to the engine E to be tested, as it rests in the engine stand S. Standards 22 and 22a are fixedly mounted in a floor plate 23, upon the base B, although in order to accommodate different engines each such standard is preferably adjustable lengthwise and transversely of the base, and also may be individually adjustable as to height; each at its upper end is formed in channel fashion, as indicated at 22b, to receive the rubber padded engine mounts which ordinarily are formed as a part of the engine itself. Hooks or hold-downs 22c are employed in conjunction with certain mounts, at least those that would tend by the torque to be urged upwardly, for the purpose of fixing the engine in position during the test, but these must be quickly releasable for removal of the engine.

Exhaust connections are provided at 24, fixedly located in proper position for registry with the exhaust manifolds of the engine to be tested, although preferably adjustably mounted in the base B and connected by flexible elements 24a below the floor plate 23, so that the upright pipes 24 may be adjusted as necessary for testing different types of engines. Coupled with the upper ends of the exhaust connections 24 are extensions 24b provided at their upper ends with couplings to match with the engine's exhaust outlet and to make a reasonably gas-tight joint therewith, and the extensions are urged upwardly into such engagement by springs 24c. It will be understood that the exhaust gases are led outwardly and discharged to the open air. Each extension 24b carries a handle 24h by which it may be rotated and pressed downward to become locked in retracted position by engagement of a pin 24p, on the interior of the tubular post 24, in the hook or side recess of a slot 24s in the wall of the extension. The extensions are in retracted position during installation and removal of engines from stand S.

Gasoline is admitted by way of the supply line 25 and thence upwardly within a standard 22, for convenience and protection, and past a petcock 25a to connect to the fuel pump of the engine being tested. The gasoline is conveyed from a supply tank (not shown) associated with the machine as a whole in much the same manner as is the normal gas tank of an automobile. In such cases as those wherein the engine is supplied minus a carburetor, and the latter is to be supplied later, a standby carburetor may be mounted upon the engine stand S and serves for ready connection to each engine as it is placed in the stand. The manner of connection is simple in any event, quickly connected and disconnected.

In advance of starting any test, oil is led from a pressurized supply tank 5 to the engine on the stand S through the supply line 50, and upwardly through one of the standards 22, to a three-way valve 51. Besides the supply line 50, lines 51a and 51b branch from the three-way valve 51. With the valve 51 in the position shown in Figure 5, line 51a leads to a point where oil can be forced by the pressure within the supply tank 5 into the lubricating passages of the engine, its cam shaft, crank shaft, and the like, which are normally supplied in the reverse sense by the engine's pump L. Likewise, oil passes in the normal sense along the lines 51b and 51c, and through the filter F, to the engine's sump, which thereby is filled to the correct level. The valve 51 is now rotated 90° clockwise, to cut off the line 50, and when the engine is started the pump L circulates oil from its sump in the normal sense, in turn through the line 51a, valve 51, lines 51b and 51c, the filter F, and the return line 51d. An oil pressure line 52 branches from the line 51b, 51c to a pressure switch 52a upon the control stand, and failure of oil pressure energizes an automatic control, stops the test, and lights up a trouble light 26d on the panel PA. Excessive oil pressure may similarly react. After a test the oil is drained from the engine through the normal drain plug, and is received in a funnel 27f, whence it is returned to a collecting point, filtered and reused.

Figure 3:
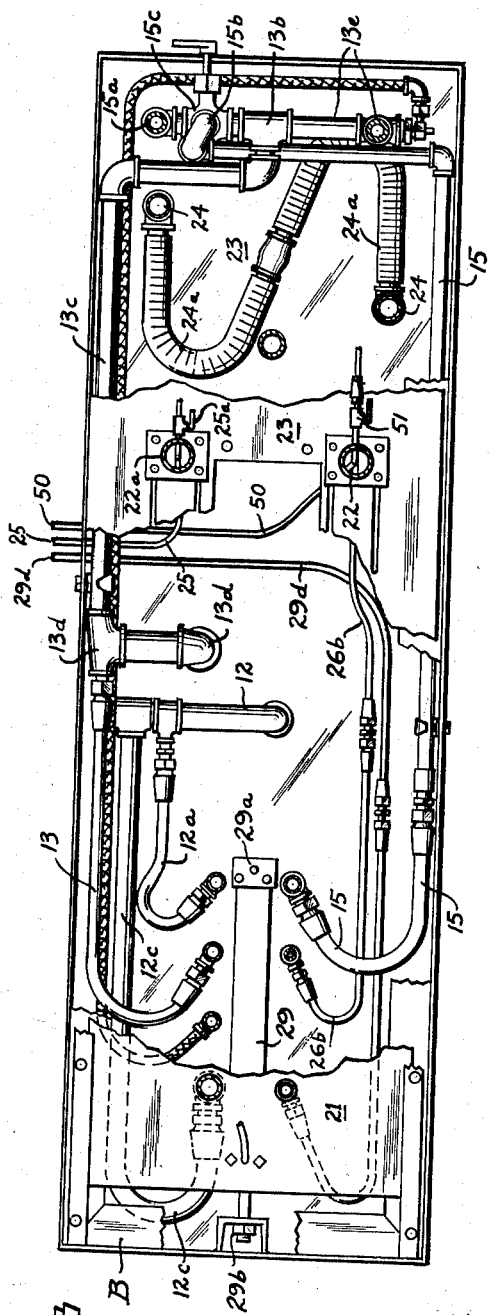
Figure 3 is a plan view of the apparatus with certain parts, such as of the dynamometer and indicator stand, removed to illustrate various fluid and wiring connections and the interrelationship of parts.
Figure 4:
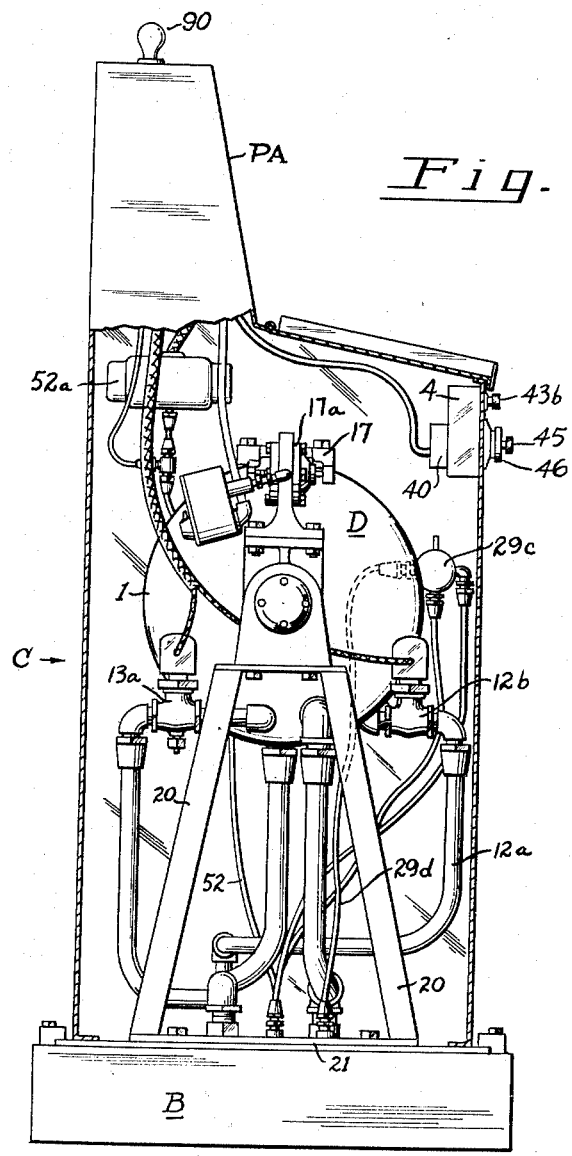
Figure 4 is an end elevation with part of the cabinet wall broken away to reveal the interior, as seen from the end opposite the motor test stand.

Water for cooling the engine preferably is that which has been preheated by being used to cool the dynamometer. It leaves the dynamometer's cooling jacket by a line 15, which runs beneath the floor plate 23, and after passing through a pressure switch 14 and a three-way valve 15c, positioned as in Figures 3 and 5, enters the engine's water pump inlet at the lower connection 15a. After passing through the water pump WP and the engine's water jacket the coolant water leaves at the upper connection 13e, but at this point its temperature affects the temperature bulb 15e (Figure 5) which is built into the engine's cooling system, and thereby affects a temperature indicator 15f on the panel PA. In the event of too high water temperature the ignition circuit is broken and the engine is stopped by closure of a switch 15g located in the cooling water discharge line 13e. Leaving at 13f, the water continues on through a water temperature regulator unit 15h, to the T at 13b and thence to the drain 13c and outlet 13d. Pressure switch 14, mentioned above, in dynamometer coolant discharge line 15 acts in the event of too high or too low pressure to break the ignition in a manner later explained.

The water supply source, normally city water mains, will deliver water at 12 (Figures 3 and 5) at a pressure in excess of that desired in the dynamometer coolant system and the engine's water circulating system, and since excessive pressure therein will terminate the test, it is necessary to reduce that pressure to a constant value, less than the water pump's delivered pressure, wherefore a pressure reducing valve 12d is employed in the line 12.

Resistance water supply to the interior of the dynamometer casing 1 branches off at 12a, and can be admitted only when a self-closing solenoid operated valve 12b is energized by closing the switch at 1b, Figure 1. The outlet at 13 is similarly controlled by the solenoid operated valve 13a, operable by the unloading switch 1c, Figure 1. Discharged resistance water goes to drain at 13d.

Figure 2:
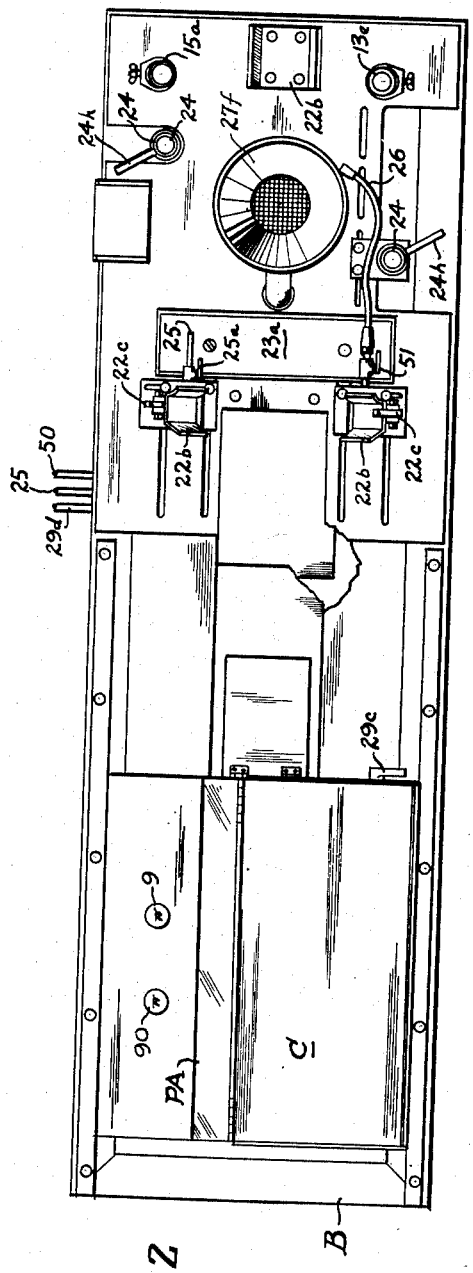
Figure 2 is a plan view of the apparatus with parts broken away.

A battery Ba (Fig. 8) is normally mounted upon the shelf 23a (Figs. 1 and 2) and its terminal connects to the ignition circuit of the engine and to the starter. Connections are also run to the panel PA, to the starter button 30 which connects to the engine's starter, to the ignition switch 31, and to the ignition light 3, which, being lighted, indicates that the ignition circuit is on, and if it is not lighted, indicates that the ignition circuit has failed. Various other switches, described later in detail, are in the ignition and trouble indicator circuits, to be opened automatically in the event of malfunctioning of the engine. Such battery is being drained repeatedly to start stiff engines, and a suitable battery charger is installed in the cabinet at the control stand, and from time to time the battery is recharged by closing the switch 32a, which also illuminates the lamp 32b (Fig. 1) to indicate that fact.

It is the intention to operate the engine through a test cycle during which it runs for, let us say, twenty minutes at 600 R. P. M., for twenty minutes more at 1200 R. P. M., and a final twenty minutes at 2200 R. P. M., each requiring a different throttle setting. During this cycle the load, once set, remains constant, although it could be changed, manually or automatically. The throttle settings are changed automatically through a cycling timer 4, shown in detail in Figures 6 and 7, operated by an electric clock 40 that drives a cam 41 (Figures 6 and 7). The cam 41 has four segments 41a, 41b, 41c, and 41d, which, through the lever 42 and cam actuated hydraulic cylinder 43 in the cycling timer box and the hydraulic jack or throttle control cylinder 43a mounted on the cabinet and connected to the throttle, control the throttle settings for the different stages of the cycle. Segment 41a is established as the idling speed for the engine, and the segments 41b, 41c and 41d open the throttle by successive increments as the cam is rotated to give the exemplary engine speeds of 600, 1200 and 2200 as stated previously.

The cam-actuated cylinder 43 is adjustably mounted in the timer box, to be shifted along slot 43s lengthwise of the arm 42, such that its actuation by the cam and lever arm can be varied; and since the cylinder 43 is hydraulically connected with the throttle-actuating cylinder 43a the amount of throttle opening is thus varied. An externally accessible thumb screw 43b secures the cylinder 43 in the desired adjusted position along slot 43s.

A switch 44 located directly beneath the lever arm 42 is actuated by the lever arm at the completion of a cycle to turn on the cycle-complete light 90 (Figs. 1 and 8) to indicate to the operator that the test has been satisfactorily completed.

A means upon the exterior of the control stand is provided for manual rotation of the cam 41 independently of the clock shaft. This is accomplished by loosening the screw 45 (Fig. 7). When so loosened the dial 46 and sleeve 46a and cam 41 may be rotated independently of the clock shaft 47, to repeat any portion of the cycle already completed, or to skip any intervening portion not desired.

During the high speed stage of the timer cycle a cam-like projection 41e on the cam disk 41 closes a normally open switch 41f in series with a normally closed switch 17d in the hydraulically actuated switch unit 17c including the pressure-sensitive diaphragm 17e, both switches being in circuit with the low power indicator 1a and the automatic ignition-interrupting control relay 31a. Since torque developed should be a maximum at the highest speed, the pressure diaphragm 17a which is acted upon by the torque arm 17, and the pressure-sensitive diaphragm 17e responsive to hydraulic pressure created by diaphragm 17a, will be so adjusted and the latter so connected, that it will open the normally closed switch 17d at the high speed range, but if engine operation is normal the timer cam projection 41e closes the normally open switch 41f somewhat after the switch 17d should open; hence closing the circuit at switch 41f will not energize the low-power ignition cut-off relay 31a. Only if the torque is insufficient to open the switch 17d before the switch 41f closes, will the motor ignition circuit be completed through the relay 31a. When that happens, the ignition circuit is broken and the trouble lights 1a and 9 are illuminated. If the cycle proceeds normally to a conclusion, the engine throttle control 43a is automatically moved to idling position, as already described.

In such an arrangement, as can be realized from the above, the normal indications of trouble during a test may be manifested as excessive engine temperature, as shown by the temperature of the cooling water, insufficient or excessive water pressure, as developed by the engine's water pump WP, insufficient or excessive oil pressure as determined by the engine's oil pump, or low power during the final stage of the test, as determined through the dynamometer. The various trouble lights or signals provided on the panel PA indicate when any such condition arises, and the panel PA mounts the low power indicator 1a, the water temperature indicator 14a, a water pressure indicator 15d, and an oil pressure indicator 26d. These are primarily indicators, and are connected into control circuits in a manner which will shortly be made clear with reference to Figure 8. There is also the main trouble light or indicator 9 and the cycle-complete light 90. The remaining indicators and controls on the panel are the main power indicator light 39 and the main power switch 39a, the timer light 4a which indicates that the timer is operating correctly, and the battery charger light 32b and the battery charger switch 32a, by means of which the operation of the charger is indicated and effected. There are also the loading switch 1b for effecting the admission of more resistance liquid to the interior of the dynamometer, and the unloading switch 1c for letting resistance liquid out of the same. The engine tachometer (not shown), is operated by the engine distributor rotor, and by comparison of its reading with that of the tachometer 16a driven by or with the dynamometer, there is obtained a direct indication of slippage in a fluid clutch built into the engine.

Many of the elements and functions represented in the schematic circuit diagram of Figure 8 have already been explained in terms of their operative relationship to parts of the machine, but reference to such diagram will be helpful in gaining an integrated picture of the electrical control system.

As will be seen in Figure 8, standard A. C. supply voltage (usually 110 volts) is applied to the main power terminals 64 and 66, at the right in the figure. For convenience, the terminal 66 is shown directly grounded, whereas the terminal 64 is connected to the conductor 68 which extends to the main power switch 39a. This switch is closed manually to energize the electrical system. From the switch 39a, a conductor 70 passes, through the normally closed contacts J of the reset switch 60, to one side of the main power indicator light 39b, the other side of which is grounded, as at 74 at the extreme left in the figure. For convenience in later description the conductor between the reset switch 60 and the main power light 39b is designated 72, whereas the conductor between the other side of the main power light and the ground connection at 74 is designated 76. It will be noted that the conductor 72 is normally at the potential of the supply, and the conductor 76 is always grounded. Opening of the main power switch, or opening of the contacts J of the reset switch remove potential from the conductor 72. Branch conductor 72a interconnects the conductor 72 with corresponding contacts of two pairs of contacts K and L in the respective relays R1a, R14a, R15d and R26d, associated respectively with the separate circuits of the low power light 1a, water temperature light 14a, water pressure light 15d, and oil pressure light 26d.

The branch conductor 72b interconnects the normally energized conductor 72 with corresponding terminals of the water temperature switch 15g, low power switch 17d, water pressure switch 14 and oil pressure switch 52a. The normally open switch 41f, closed by the cycling timer only during the high speed phase of engine operation, is interposed in the connection between the low power switch 17d and the wire 72b. A branch conductor 78 extends from ground at 79, through the switch contacts M of the normally closed multiple-switch master relay RM, to one side of the cycling timer motor 40 and indicator light shown adjacent thereto. The other side of the timer motor and light 4a are connected by conductor 78' to one of the normally open contacts I of reset switch 69, the other of which is connected to conductor 70. The relay RM has multiple groups of switch contacts, including contact pairs M, N, O, P and Q, all normally closed, as mentioned.

From the oil pressure switch 52a there extends a conductor 80 through the master relay contacts Q, through the oil pressure trouble light 26d, to the ground conductor 76. Connected in parallel with the light 26d is the winding of an associated relay R26d. A branch conductor 80a interconnects the conductor 80, at a location between the light 26d and the contacts Q, with that contact of the pair L which cooperates with the one connected to the conductor 72a, as shown. The corresponding contact of the pair K in the same relay is connected by a conductor 82a with a main conductor 82, which in turn is connected, through the winding of the master relay RM and the conductor 82', to the ground conductor 76.

The other side of the water pressure switch 14 is similarly connected by a conductor 84, through the contacts P of the master relay RM, to the water pressure trouble light 15d and associated relay R15d, and by the branch conductor 84a to a corresponding other contact in the pair L of the relay R15d. The other corresponding contact of the pair K in the same relay is connected by the branch conductor 82b to the conductor 82.

The conductor 86 interconnects the low power switch 17d and the low power light 1a and relay R1a. Branch conductors 86a and 82d connect to the contacts L and K of the relay R1a in a manner similar to the corresponding conductors previously described, associated with the other trouble relays and trouble lights.

The conductor 88, extending from the other side of the water temperature switch 15g, does not pass through contacts in the master relay RM in the figure, but passes directly to the parallel-connected water temperature light 14a and corresponding relay R14a. However, the branch conductors 88a and 82c are connected to the contacts K and L of relay R14a from the respective conductors 88 and 82 in a manner similar to the corresponding connections described with reference to the other trouble lights and relays, as shown.

It will be noted that the conductor 82 extends from one side of the coil of the master relay RM to one side of the main trouble light 9 at the top of the figure. The other side of this trouble light is connected to the ground conductor 76.

Cycle-complete switch 44 has two pairs of contacts 44a and 44b. The former are open at the outset, but are closed during execution of a cycle of test operation, by cam 41 of the cycling timer. Contacts 44b are oppositely actuated, being closed only at the completion of a cycle of operation of the timer, when the cam follower drops into the idle-speed segment 41a of the cam 41. Contacts 44a, therefore, by-pass the reset switch contacts I to maintain the timer motor 40 energized during the cycle, once the reset switch has been held closed at I long enough to start and run the motor a short time, and thus to commence a test cycle, as is made clear hereinafter. When the cycle is completed these contacts 44a open and the timer motor is deenergised and stops. At the same time, contacts 44b close and energize the cycle-complete light 90.

During normal or fault-free operation of the test system, and of the engine under test, all of the trouble switches 15g, 17d, 14, and 52a are open. However, should, for example, the lubricating oil pressure drop below the necessary value for satisfactory lubrication of the engine being tested, the contacts of oil pressure switch 52a will automatically close, completing the energizing circuit for the oil pressure trouble light 26d and the relay R26d. The contacts K of this relay close and complete the circuit for the master relay RM through the conductors 82a, 82 and 82', so that the master relay is then opened. The master relay has a set of contacts N which when opened by malfunctioning of any part of the engine, as by faulty oil pressure, in the example just described, open the ignition circuit to stop the engine under test. This ignition circuit includes the battery Ba at the lower part of the figure, the ignition switch 31, the contacts N and the engine ignition coil (not shown). The engine ignition coil is similarly deenergized by opening of the master relay should any of the other three illustrated trouble switches be closed by the occurrence of a fault in the test system or engine. Consequently in any one instance only one trouble is indicated, except where two develop simultaneously and energize two of the holding relays. One reason for interrupting the trouble indicator circuits together by opening of master relay RM is seen in the example of engine stoppage owing to excessive water temperature. When the engine thus stops from this sole cause, oil pressure necessarily drops, and were the oil pressure trouble light circuit not opened by relay RM at the same time a false indication of oil pressure trouble would be the result. However, it is unnecessary to open the water temperature circuit in this manner because water temperature does not increase when the engine is stopped, water circulation continuing as a result of pressure in line 15 (Fig. 5).

While closure of the contacts K of the relay R26d effected completion of the energizing circuit for the coil of the master relay RM, the contacts L of the same relay form a holding circuit through conductor 80a, which holds or continues the energization of the coil of relay R26d and illumination of light 26d. This holding action continues even though the trouble, such as with low oil pressure, excessive water temperature (removed after engine shut-down, because of continued cooling flow), etc., was felt only momentarily and quickly removed itself to permit the appropriate switch to reopen. This holding action feature is important because, without it, the trouble lights would be deenergized after motor shut-down when the trouble switches opened again, and the attendant might not detect the nature of the difficulty.

The same holding circuit completed by contacts L of the relay R26d also continues energization of the master relay RM to hold open the ignition circuit and the other circuits in the system associated with the master relay for reasons already explained. Another reason for holding open the ignition circuit by the master relay RM is so that the engine cannot "catch" again, and keep running, to its damage, as it might do were the ignition restored after only a momentary fault which removed itself before the engine parts came to rest.

Through similar circuit connections the water pressure trouble light 15d is illuminated and the accompanying relay R15d energized should water pressure fall to a level which is low enough to permit closure of the switch 14.

As has already been described in connection with Figure 6, the low power trouble light 1a is illuminated only when both of the switches 41f and 11d are closed. When this condition occurs the relay R1a is energized as the light 1a is illuminated, just as in the previously described cases.

In the case of the water temperature trouble light 14a and its relay R14a, the water temperature switch 15g effects their energization if the water temperature exceeds a predetermined safe value, and the operation is the same as in the previous cases, except that, for reasons explained, the circuit formed need not and does not pass through contacts in the master relay. Another reason assignable for this desired difference in connections in the case of the water temperature trouble light and relay is that even after the contacts of relay RM are opened and the engine stopped, as by oil pressure trouble for instance, should pressure in line 15 for any reason fail as the engine stops, engine water temperature may continue to rise thereafter. It may be that it will rise above the "safe" value even after stoppage of the engine, and this fact should show on the indicator board, by light 14a, which it would not do were the conductor 88 to pass through contacts of master relay RM. Nevertheless, the other connections are such that holding action of the relay R14a continues the illumination of the water temperature trouble light and also holds open the master relay RM through the circuit including the conductors 82 and the relay contacts K of relay R14a, even should a temperature excess causing closure of switch 15g be but momentary.

It will be noted that the main trouble light 9 is illuminated whenever any of the particular trouble lights 1a, 14a, 15d or 26d are illuminated, because the accompanying closure of any of the corresponding relays R1a, R14a, R15d or R26d places the conductor 82, connected to one side of the main trouble light, at line supply potential, whereas the other side of the main trouble light is connected to the ground conductor 76. Since illumination of the main trouble light depends, therefore, likewise upon the operation of the individual relays, it will also continue to be illuminated because of the relay holding action, even though the trouble which produced the illumination of the main trouble light removes itself after the engine stops, or otherwise.

At the end of the cycle of operation closure of the cycle-complete switch contacts 44b energizes the light 90, and simultaneous opening of contacts 44a deenergizes the timer motor 40. At this point, or whenever the cycle of operation is to be started again, the reset switch 60 is used. The reset switch has two main functions; one is to deenergize the holding relays R1a, R14, R15d or R26d, hence permit deenergization of the master relay RM and of any trouble lights which may have been illuminated after a fault occurred, that is, reset the circuit to the "nofault" condition. This is accomplished by momentary removal of voltage from the conductor 72 by opening the contacts J of the reset switch upon operation of such switch.

The other function of the reset switch 60 is to supply electrical energy to the cycling timer motor 40 through the conductor 78' for starting such motor to initiate a new cycle of operation, it being noted that the contacts 44a remain open as long as the cycling timer cam 41 continues to occupy its rest, or zero, position and that separate energization to start the motor is therefore necessary. Closure of contacts I of the reset switch 60 energizes the cycling timer motor for this purpose, by-passing contacts 44a.

It is necessary at the start of a cycle to press the reset switch to close the contacts I for a finite length of time determined by two factors. One is to initiate sustained operation of the cycling timer. However, because the circumferential length of the notch 41a in the periphery of the timer cam 41 is very short, only slight rotation of such cam is necessary to effect reclosure of the cycle-complete switch 44a and energize the timer thereby. The other factor is that of oil pressure. At the start of a cycle, until oil pressure is built up in the engine, the switch 52a cannot reopen, and relay RM is held open by energization, and closure of the contacts of relay R26d. The timer cannot start, nor can the engine be started when relay RM is thus held open. This preliminary delay is short, however, for pressure builds up quickly.

The circuit diagram of Figure 8 does not purport to be a complete electrical wiring diagram for the entire test apparatus, because it omits, for instance, the water temperature indication circuit, the circuit for the starter motor for the automobile engine, the battery charging circuit, the engine and dynamometer speed indicators, and other miscellaneous items, which, however, are not necessary to an understanding of the principal features of the invention as herein described.

In the operation of the device an engine is supported by means of its supporting brackets received in the supports 22b of the engine stand S. These have been properly adjusted to position, since they will be employed throughout an extended run upon a single type of engine, and the engine so supported should align accurately with the coupling 10a to the dynamometer D, which, however, has been shifted with the entire control stand C to the left, as viewed in Figure 1. As soon as the engine is properly seated and the various connections of gasoline, oil, electrical supply, water throttle control, etc., are made to it, the cabinet at the control station C is advanced to interconnect the coupling at 10 and 10a with the engine shaft, the advance being accomplished through a cylinder 29 anchored at 29a to the sliding plate 21, and the plunger whereof is connected at 29b to the base B. The exhaust connections are then made. A control valve 29c is located conveniently to the operator to supply air to the cylinder by way of the air line 29d. The engine is prelubricated as already explained.

Now, by closing the ignition switch 31 and manipulating the starter button 30, the engine can be started and the test commences. The cycling timer has been properly set or reset to zero or start, and takes over control of the engine throttle. The dynamometer is loaded or unloaded, as may be necessary to deliver correct torque at the initial speed. The test proceeds through the allotted period, and at the predetermined speeds and loading. If trouble develops, the appropriate trouble light, 1a, 14a, 15d or 26d, lights up, the engine is stopped, the main trouble light 9 is illuminated, and the attendant, who has been busy elsewhere, has his attention called to the trouble and knows by the individual trouble indicator wherein the trouble lies. He can set aside the engine or, if the trouble can be readily corrected, he corrects it, and restarts the test, and in so doing he may reset all parts to start the test anew, or may start over again and pick up at the point where the test ceased. The functions of the reset switch have already been described. If no trouble develops, the test proceeds normally through the several stages, and upon completion the cycle-complete light 90 is illuminated, the engine idles down and remains thus until the operator returns and cuts the ignition at the switch 31, whereupon the engine can be drained of oil, the gasoline, exhaust, electrical supply and water connections and the oil connections are disconnected, and the engine is removed from the stand S.

I claim as my invention:

1. In a test dynamometer for testing internal combustion engines and the like, trouble indicator and control circuit means comprising a plurality of control switches individually operated by particular conditions of malfunctioning of the engine being tested, a plurality of corresponding trouble indicators individually energizable by operation of their respective control switches, a plurality of corresponding holding relays individually energizable by operation of their respective control switches to maintain energization of a trouble indicator, and a master relay actuated by operation of any of said holding relays and having a plurality of sets of contacts respectively in circuit with the holding relays and trouble indicators to break the energizing circuits of the other holding relays and indicators upon actuation of said master relay by operation of one such holding relay, such that only one such indicator will be energized at any one time.

2. The test dynamometer as in claim 1, and a further set of contacts in the master relay opening the ignition circuit of the engine upon actuation of said master relay.

3. The test dynamometer as in claim 1, and a cycling timer operating the tested engine under differing power conditions during successive phases of a cycle of operation, and a further set of contacts in the master relay to stop the cycling timer, hence fix the timer means at a particular setting, by actuation of said master relay upon occurrence of a condition of malfunctioning of the engine responded to by one of the control switches.

4. The test dynamometer as in claim 3, wherein the timer has an initial setting establishing operation of the engine in idling condition during only a short initial period of the total control cycle of such timer, and stop-switch means operated by the cycling timer reaching such idling setting at the completion of a cycle, to idle the engine and stop the timer.

5. The test dynamometer as in claim 4, including switch means operatively connected to the stop-switch means for closure when the latter is open, and vice versa, and indicator means electrically connected for operation by said switch means to indicate completion of the cycle of operation upon closure of said switch means.

6. The test dynamometer as in claim 5 and manually operated reset switch means including a first pair of contacts which are normally closed, connected in circuit with all the holding relays but shiftable to open position to deenergize the same, and including a second pair of contacts shiftable with the first pair from a normally open to a normally closed position, to initiate operation of the cycling timer, by-passing the stop-switch means until after the idling setting of the timer is passed and the stop-switch opens, whereupon the reset switch may be released and the timer continues through its control cycle.

7. The test dynamometer as in claim 1 wherein the control switches individually respond to low oil pressure, low water pressure, and, in association with the dynamometer, low engine torque, respectively.

8. Mechanism for testing an internal combustion engine which itself incorporates a throttle element settable to regulate its fuel supply, a lubricating system including an oil pump for circulation of lubricant, a cooling system including a water pump for circulation of coolant, an electrical ignition system, and an exhaust conduit, which testing mechanism comprises: a fixed base, an engine stand mounted on said base, and including engine-mount elements for temporarily supporting an engine to be tested in a predetermined position, a control stand mounted on said base for shifting towards and from an engine so mounted and positioned, a dynamometer mounted on said control stand, coupling means to connect the engine's shaft with the dynamometer upon shifting of the control stand into operative position relative to an engine so mounted and positioned, a throttle-controlling device operatively engageable with the engine's throttle element when the control stand is so shifted, an oil supply conduit arranged for quick and temporary connection to and disconnection from the engine and its lubricating system and oil pump, a water supply conduit similarly arranged for quick and temporary connection to and disconnection from the engine's cooling system and water pump, electrical leads arranged for connection from an external source to the engine's ignition system, an exhaust lead-off conduit arranged for quick and temporary connection to and disconnection from the engine's exhaust conduit, whereby, after making such connections and initiating operation of its own oil and water pumps and ignition system, respectively, the engine will continue to function through the medium of its own lubricating system, cooling system, ignition system, and throttle element; means to sense malfunctioning of the engine's own lubricating system and of its own cooling system, respectively, means to sense low torque as delivered through the dynamometer, means on the control stand responsive automatically to departure from a norm as sensed by each such sensing means, to indicate such departure, timer means driven independently of said sensing means, and of the engine being tested, and operatively connected to said throttle-controlling device, to set the throttle element of the engine at different predetermined settings at predetermined intervals, in the absence of any departure from a norm, and means automatically operable by any such departure, as sensed by any of said sensing means, to interrupt the normal operation of the engine's ignition system through said electrical leads, and of said timer means.

9. Mechanism for the purpose and constructed in the manner set forth in claim 8, including a general malfunctioning indicator, and means interconnecting the latter to each individual indicating means, for actuation of said general indicator simultaneously with actuation of any one individual indicator.

10. Mechanism for the purpose and constructed in the manner set forth in claim 8, including electric circuit means for actuation of the several indicating means, a master relay in said circuit means controlling current supply to individual indicating means, to the timer means, and to the ignition system, and closed during normal operation, means actuated by each indicating circuit under the influence of malfunctioning, to open said master relay, and thereby to terminate operation of the engine and the timer, and to preclude actuation of another indicating means, and holding means in circuit with the individual indicating means, to retain energized that one which effected opening of the master relay.

11. Mechanism for the purpose and constructed in the manner set forth in claim 10, including a general malfunctioning indicator, and circuit means interconnecting the latter to each individual indicating means through the holding means for said individual means, for energization of said general indicator simultaneously with actuation of any one individual indicator, and retention of its energization after said master relay is opened.

12. Mechanism for the purpose and constructed in the manner set forth in claim 8, wherein the throttle-controlling element is mounted upon the control stand in position to engage operatively with the engine's throttle element by correct positioning of the control stand and operative engagement of the coupling means connecting the engine's shaft with the dynamometer.

13. Mechanism for the purpose and constructed in the manner set forth in claim 8, wherein the means to sense malfunctioning of the cooling system, and the corresponding indicating means, includes means to sense and to indicate excessive temperature, and further means to sense and to indicate improper pressure in the cooling system.

14. Mechanism for the purpose and constructed in the manner set forth in claim 8, including means in the timer means to withhold from possible actuation the means to sense low torque, until such time as the throttle-controlling device has been advanced to full-power setting.

15. Mechanism for the purpose and constructed in the manner set forth in claim 8, including electric circuit means for actuation of the several indicating means, a master relay in said circuit means controlling current supply to each individual indicating means except the water temperature indicator, to the timer means, and to the ignition system, and closed during normal operation, holding means in circuit with each individual indicating means, to retain energized that one which by its energization indicates malfunctioning, and circuit means connecting each individual holding means with the master relay, to energize the latter and to move it to open position, upon energization of any individual indicating means and its holding means, to terminate further operation of the engine being tested, and of the timer means.

16. Mechanism for the purpose and constructed in the manner set forth in claim 8, including electric circuit means for actuation of the several indicating means, a master relay in said circuit means controlling current supply to individual indicating means, to the timer means, and to the ignition system, and closed during normal operation, means actuated by each indicating circuit under the influence of malfunctioning, to open said master relay, and thereby to terminate operation of the engine and the timer, and to preclude actuation of another indicating means, and holding means in circuit with the individual indicating means, to retain energized that one which effected opening of the master relay, a manual switch in said circuit means, controlling primarily the supply of current to the timer means, and secondarily current supply to the individual holding means, and normally biased to cut off current supply to the timer and to establish current supply to said individual holding means, but shiftable to reverse such conditions, and a switch including a pair of contacts which when closed by-pass said manual switch and supply current to the timer means by way of the master relay, and which when open break such current supply to said timer means, and means operable under the influence of the timer means at the close of a cycle to open said contacts, and to break the current supply to all the individual holding means and thereby permit reclosing of the master relay.

17. Mechanism as set forth in claim 16, wherein the timer-controlled switch includes a second pair of contacts operatively connected to the first pair to be open while the first pair is closed, and vice versa, and a cycle-complete indicator in circuit with said second pair of contacts, and arranged for energization through the latter at termination of a cycle.

HAROLD L. BENNETT.

References Cited in the file of this patent

UNITED STATES PATENTS

| Number | Name | Date |
|---|---|---|
| 1,481,471 | La Londe | Jan. 22, 1924 |
| 1,508,353 | Scott | Sept. 9, 1924 |
| 1,892,295 | Walker | Dec. 27, 1932 |
| 2,452,550 | Cline | Nov. 2, 1948 |
| 2,513,816 | Patterson et al. | July 4, 1950 |